(12) United States Patent
Okuzono

(10) Patent No.: US 11,493,969 B2
(45) Date of Patent: Nov. 8, 2022

(54) INFORMATION PROCESSING APPARATUS, CONTROLLING METHOD THEREOF, AND PROGRAM

(71) Applicant: CANON KABUSHIKI KAISHA, Tokyo (JP)

(72) Inventor: Ryotaro Okuzono, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 16/716,215

(22) Filed: Dec. 16, 2019

(65) Prior Publication Data

US 2020/0201406 A1 Jun. 25, 2020

(30) Foreign Application Priority Data

Dec. 25, 2018 (JP) .............................. JP2018-241725

(51) Int. Cl.
*G06F 1/26* (2006.01)
*H02M 7/04* (2006.01)

(52) U.S. Cl.
CPC ................. *G06F 1/26* (2013.01); *H02M 7/04* (2013.01)

(58) Field of Classification Search
None
See application file for complete search history.

(56) References Cited

U.S. PATENT DOCUMENTS

| 9,886,079 | B2* | 2/2018 | Ito | G06F 1/3228 |
| 10,649,512 | B2* | 5/2020 | Ou Yang | H02J 7/045 |
| 2011/0064445 | A1* | 3/2011 | Yashiro | G03G 15/5004 |
| | | | | 399/88 |
| 2015/0009516 | A1* | 1/2015 | Choi | H04N 1/00891 |
| | | | | 358/1.13 |
| 2019/0214915 | A1* | 7/2019 | Jeong | H02M 3/33507 |

FOREIGN PATENT DOCUMENTS

JP 2012-115995 A 6/2012

\* cited by examiner

*Primary Examiner* — Fahmida Rahman
(74) *Attorney, Agent, or Firm* — Canon U.S.A., Inc. I.P. Division

(57) ABSTRACT

The present disclosure is directed to switch a voltage to be supplied to a power source switch in accordance with a state of a power source of an apparatus and restrain power consumption of the power source switch.

11 Claims, 5 Drawing Sheets

INFORMATION PROCESSING APPARATUS, CONTROLLING METHOD THEREOF, AND PROGRAM

BACKGROUND OF THE INVENTION

Field of the Invention

The present disclosure relates to an information processing apparatus, a controlling method thereof, and a program.

Description of the Related Art

There is known an MFP serving as an information processing apparatus that executes various processes such as a copy process, a print process, and a FAX process. An information processing apparatus such as a multi function peripheral (MFP) includes a power source switch for switching on or off a power source of the apparatus, and, when a user operates the power source switch, supply of power to the apparatus is started or stopped.

Japanese Patent Laid-Open No. 2012-115995 discloses that a power source switch and a DCDC converter are arranged on an identical power source line. In a case where the power source switch 35 is on, power is supplied to a DCDC converter 31 from an AC adapter 2 via the power source switch 35. Meanwhile, in a case where the power source switch is off, power is supplied to the power source switch 35 from the AC adapter 2, but supply of power to the DCDC converter 31 is stopped.

In the above-mentioned power source switch, a minimum load current is defined to guarantee switching on/off operation, and, in order to cause the minimum load current to flow when the power source switch is turned on, it is necessary to supply power even in a state in which the power source is off.

SUMMARY OF THE INVENTION

An information processing apparatus disclosed in the present disclosure includes, a first converter configured to convert AC power to DC power of a first voltage, a power source switch operated by a user, a second converter configured to, after the power source switch is switched on, convert the DC power of the first voltage converted by the first converter to DC power of a second voltage lower than the first voltage, and a first power source controlling unit configured to change, from either the first converter or the second converter, power supplied to the power source switch, in accordance with a state of a power source of the information processing apparatus.

Further features of the present disclosure will become apparent from the following description of exemplary embodiments (with reference to the attached drawings).

DESCRIPTION OF THE EMBODIMENTS

Embodiment

Hereinafter, this embodiment will be described in detail with reference to the drawings. In the following embodiment, an MFP will be exemplified as an information processing apparatus. However, the information processing apparatus is not limited to the MFP and may be an information processing apparatus such as an SFP or a PC.

Figure 1:
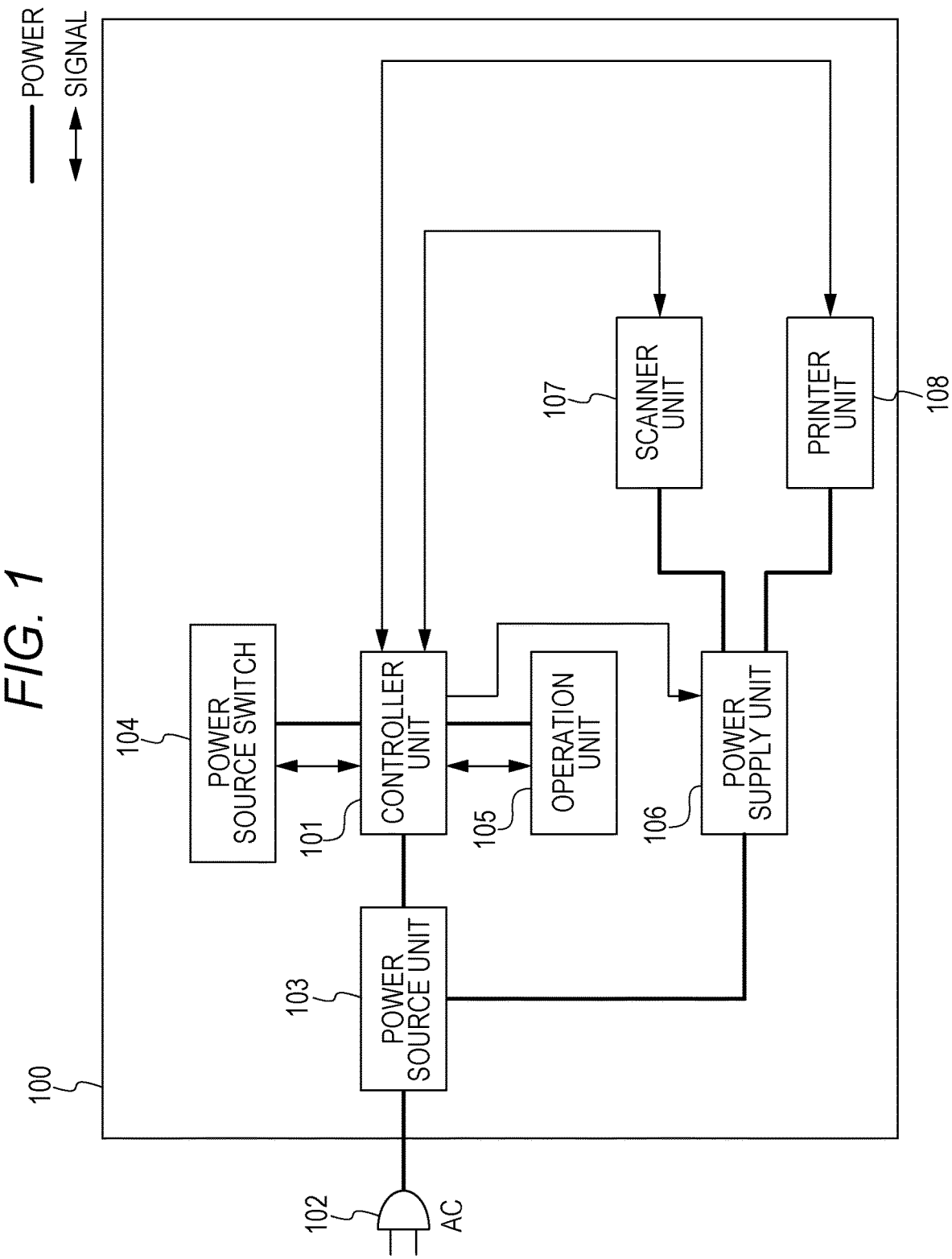
FIG. 1 is a schematic diagram showing an information processing apparatus according to an embodiment of the present disclosure.

FIG. 1 is a schematic diagram showing a configuration of an MFP 100 in this embodiment.

In FIG. 1, the MFP 100 includes a controller unit 101, an AC plug 102, a power source unit 103, a power source switch 104, an operation unit 105, and a power supply unit 106. The MFP 100 further includes a scanner unit 107 and a printer unit 108. The controller unit 101 is connected to the power source unit 103, the power source switch 104, the operation unit 105, the power supply unit 106, the scanner unit 107, and the printer unit 108. The AC plug 102 is connected to the power source unit 103.

The MFP 100 can execute various processes such as a scanning process and a print process. The controller unit 101 comprehensively controls the whole MFP 100. The AC plug 102 is inserted into an external outlet serving as a power source. Commercial AC power is supplied to the power source unit 103 from the external outlet via the AC plug 102. The power source unit 103 converts AC power supplied from the external outlet to DC power and supplies the power to the controller unit 101 and the power supply unit 106. The power source switch 104 is a switch for allowing a user to control start-up and stop of the MFP 100. The power source switch 104 is, for example, a rocker switch that physically maintains a state showing start-up or stop of the MFP 100. Note that, in this embodiment, power is supplied to the power source switch 104 and the operation unit 105 via the controller unit 101.

The power source switch 104 notifies the controller unit 101 that the MFP 100 is in an activated state (on state) or a shutdown state (off state). The operation unit 105 includes a display unit and an operation key (not shown) and accepts an instruction to execute each process input from the user. The scanner unit 107 reads a document placed on a platen (not shown) and generates image data. The printer unit 108 prints on a sheet of paper on the basis of image data or the like generated in the scanner unit 107. The power supply unit 106 supplies power supplied from the power source unit 103 to the scanner unit 107 and the printer unit 108. Whether or not the power supply unit 106 supplies power to the printer unit 108 and the scanner unit 107 is controlled by a CPU 204 of the controller unit 101.

Figure 2:
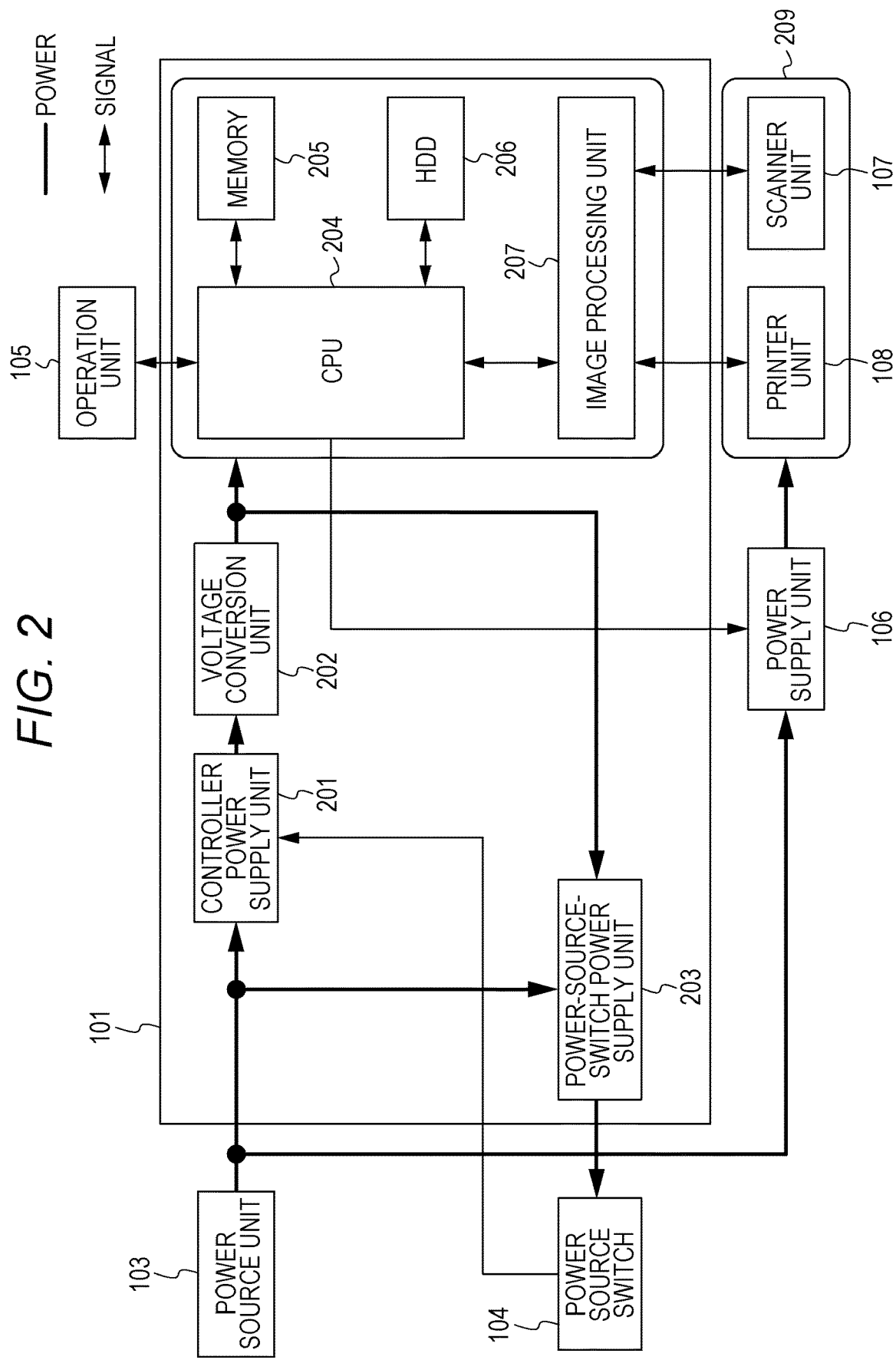
FIG. 2 is a block diagram showing an internal configuration of a controller unit according to an embodiment of the present disclosure.

FIG. 2 is a block diagram schematically showing an internal configuration of the controller unit 101 in FIG. 1.

In FIG. 2, the controller unit 101 includes a controller power supply unit 201, a voltage conversion unit 202, a power-source-switch power supply unit 203, the CPU 204, a memory 205, an HDD 206, and an image processing unit 207.

The controller power supply unit 201 monitors a state of the power source switch 104 and, when the power source switch is changed from the off state to the on state, supplies DC power supplied from the power source unit 103 to the voltage conversion unit 202. Because DC power is supplied to the voltage conversion unit 202 from the power source unit 103, the CPU 204 starts to execute a start-up program and executes a start-up process of the MFP 100. As described above, the controller power supply unit 201 controls power to be supplied to a control unit including a CPU, a memory, a DHH, and the like.

The voltage conversion unit 202 converts a voltage of DC power supplied from the controller power supply unit 201 to a voltage to be supplied to the CPU 204, the memory 205, the HDD 206, the image processing unit 207, and the power-source-switch power supply unit 203.

DC power output by the voltage conversion unit 202 is supplied to the CPU 204, the memory 205, the HDD 206, the image processing unit 207, and the power-source-switch power supply unit 203. Note that the voltage conversion unit 202 converts DC power supplied from the power source unit 103 to DC power having a voltage lower than that of the above-mentioned DC power and outputs the converted DC power.

The power-source-switch power supply unit 203 is connected to the power source unit 103, the power source switch 104, and the voltage conversion unit 202. The power-source-switch power supply unit 203 supplies DC power supplied from the power source unit 103 or DC power supplied from the voltage conversion unit 202 to the power source switch 104. The power-source-switch power supply unit 203 controls power to be supplied to the power source switch. Operation of the power-source-switch power supply unit 203 will be described below with reference to FIG. 3.

The CPU 204 is connected to the operation unit 105, the power supply unit 106, the memory 205, the HDD 206, and the image processing unit 207. The CPU 204 executes programs stored on the HDD 206 and performs various kinds of control. The CPU 204 controls whether to supply power to the printer unit 108 and the scanner unit 107 from the power supply unit 106. For example, in a case where the MFP 100 transitions to a sleep mode that consumes less power than a standby mode while maintaining the power source switch 104 in an on state, the CPU 204 instructs the power supply unit 106 to stop supply of power to the printer unit 108 and the scanner unit 107. With this, it is possible to restrain power consumption of the MFP 100 in the sleep mode. In this embodiment, even in a case where the MFP 100 is in the sleep mode, the voltage conversion unit 202 generates DC power, and the power-source-switch power supply unit 203 supplies DC power output by the voltage conversion unit 202 to the power source switch 104. With this, even in a case where the MFP 100 is in the sleep mode, it is possible to supply DC power generated by the voltage conversion unit 202 to the power source switch 104, instead of supplying DC power generated by the power source unit 103 to the power source switch 104.

The memory 205 is a volatile memory and is a main memory that stores data or the like generated by execution of each program of the CPU 204. The HDD 206 stores the programs executed by the CPU 204, setting information regarding the MFP 100, and the like. The image processing unit 207 performs image processing such as color space conversion with respect to image data generated in the scanner unit 107 and outputs the converted image data to the printer unit 108. When the MFP 100 is started up, DC power output from the voltage conversion unit 202 is supplied to the CPU 204. In response to the supply of power, the CPU 204 reads a program stored on the HDD 206, executes the program, and starts a start-up process of the MFP 100.

Figure 3:
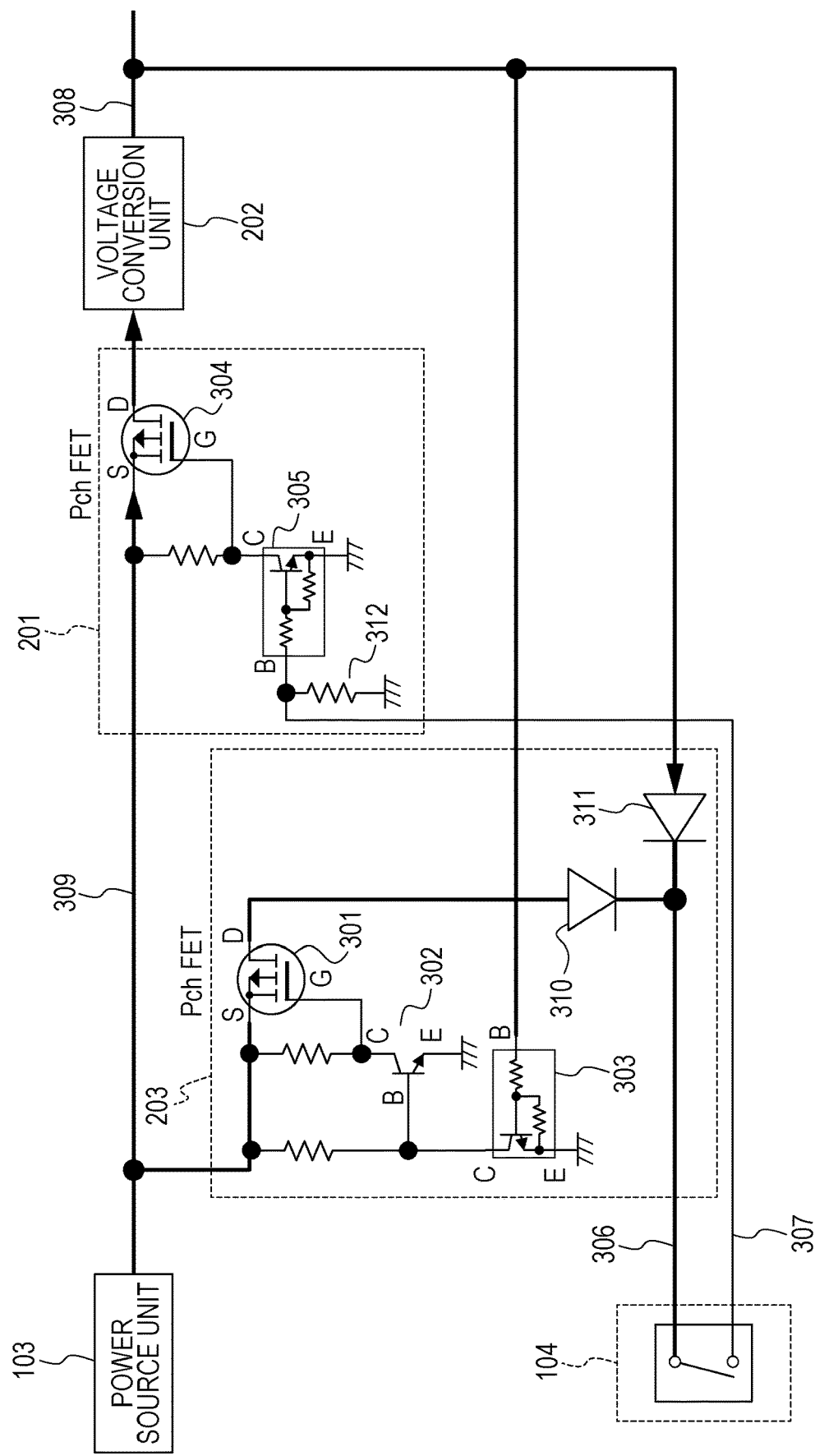
FIG. 3 is a block diagram showing an internal configuration of a power-source-switch power supply unit and a controller power supply unit according to an embodiment of the present disclosure.

FIG. 3 is a block diagram showing an internal configuration of the power-source-switch power supply unit 203 and the controller power supply unit 201 in FIG. 2.

The power-source-switch power supply unit 203 includes an FET 301, a transistor 302, a digital transistor 303, and diodes 310 and 311. The FET 301 is a switching element that switches whether to supply DC power supplied from the power source unit 103 to the power source switch 104. A source terminal of the FET 301 is a terminal to which DC power 309 supplied from the power source unit 103 is supplied. A gate terminal of the FET 301 is connected to a collector terminal of the transistor 302. That is, the FET 301 is switched on/off in accordance with on/off operation of the transistor 302. A drain terminal of the FET 301 is connected to the power source switch 104 via the diode 310. The FET 301 is turned on when a potential difference between the gate and the source is equal to or more than a threshold value. Note that the FET 301 is a p-channel power MOSFET in this embodiment.

A base terminal of the transistor 302 is connected to a collector terminal of the digital transistor 303. The collector terminal thereof is connected to the gate terminal of the FET 301. An emitter terminal thereof is grounded. The transistor 302 is turned on when a voltage applied to the base is equal to or more than a threshold value. The transistor 302 is switched on/off in accordance with on/off operation of the digital transistor 303.

A base terminal of the digital transistor 303 is connected to DC power 308 supplied from the voltage conversion unit 202. The collector terminal thereof is connected to the base terminal of the transistor 302. An emitter terminal thereof is grounded. The digital transistor 303 is turned on when a voltage applied to the base is equal to or more than a threshold value. That is, the digital transistor 303 is switched on/off on the basis of a change in output from the voltage conversion unit 202.

Note that the gate terminal of the FET 301 and the base terminal of the transistor 302 are subjected to a pull-up process by using the DC power 309 supplied from the power source unit 103.

DC power 306 of the power source switch 104 is connected to the drain terminal of the FET 301 via the diode 310 and is also connected to the DC power 308 supplied from the voltage conversion unit 202 via the diode 311.

The controller power supply unit 201 includes an FET 304, a digital transistor 305, and a load resistor 312. The FET 304 is a switching element that switches whether to supply the DC power 309 supplied from the power source unit 103 to the voltage conversion unit 202. A source terminal of the FET 304 is connected to the DC power 309 supplied from the power source unit 103. A gate terminal of the FET 304 is connected to a collector terminal of the digital transistor 305, and a drain terminal thereof is connected to the voltage conversion unit 202. That is, the FET 304 is switched on/off on the basis of switching on/off of the digital transistor 305. Note that the FET 304 is a p-channel power MOSFET in this embodiment.

A base terminal of the digital transistor 305 is connected to a power source switch signal 307 supplied from the power source switch 104. A collector terminal thereof is connected to the gate terminal of the FET 304. An emitter terminal thereof is grounded. The digital transistor 305 is switched on/off on the basis of a signal input from the power source switch 104 via the power source switch signal 307. In this embodiment, in a case where the power source switch 104 is turned on and the power source switch signal 307 is H (High), the digital transistor 305 is turned on.

Note that the gate terminal of the FET 304 is subjected to a pull-up process by using the DC power 309 supplied from the power source unit 103. The load resistor 312 is a load resistor for causing a necessary minimum load current to flow to the power source switch 104.

Figure 4:
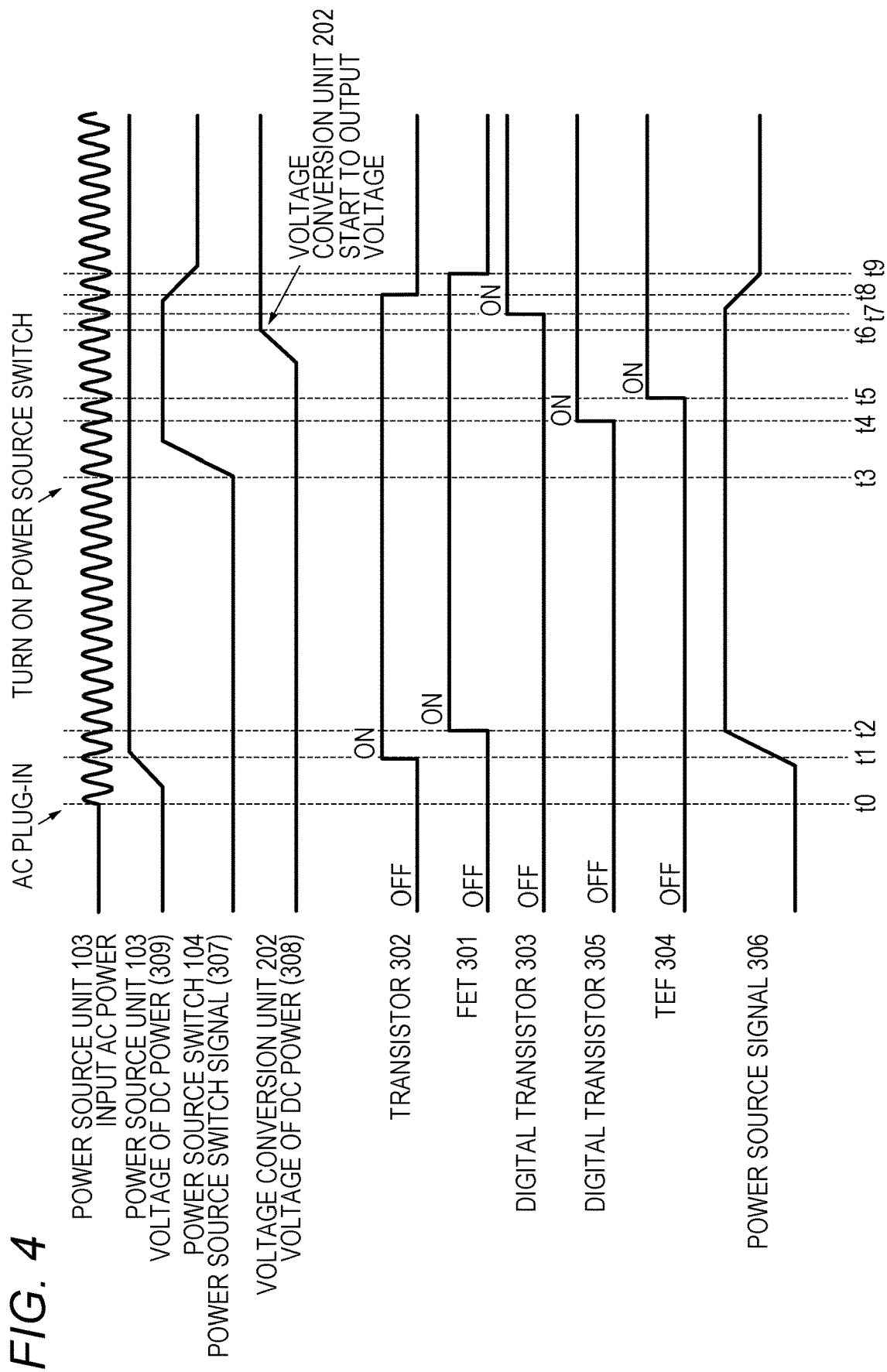
FIG. 4 is a timing chart showing operation of a power-source-switch power supply unit and a controller power supply unit at the time of starting up the information processing apparatus according to an embodiment of the present disclosure.

Next, operation of the power-source-switch power supply unit 203 and the controller power supply unit 201 at the time of turning on the power source switch in this embodiment will be described with reference to FIG. 4. FIG. 4 is a timing chart showing processes of the power-source-switch power supply unit 203 and the controller power supply unit 201 at the time of turning on the power source switch.

Before the AC plug is inserted into the external outlet, the power source switch is in an off state, and all the FET 301, the transistor 302, and the digital transistor 303 of the power-source-switch power supply unit 203 are in an off state. Further, the FET 304 and the digital transistor 305 of the controller power supply unit 201 are also in an off state.

First, when the user inserts the AC plug 102 into the external outlet, supply of AC power to the power source unit 103 from the external outlet via the AC plug 102 is started (t0).

When AC power is supplied from the external outlet, the power source unit 103 converts the AC power to DC power and starts to output the DC power 309 (t1).

When supply of the DC power 309 is started, the DC power is applied to the base terminal of the transistor 302 of the power-source-switch power supply unit 203, and the transistor 302 is switched from the off state to an on state. When the transistor 302 becomes the on state and a current flows between the collector and the emitter of the transistor 302, a potential difference is generated between the source and the gate of the FET 301, and the FET 301 is switched from the off state to an on state (t2). With this, the DC power 309 output from the power source unit 103 is input to the power source switch 104 via the diode 310 and the DC power 306.

At this time, the collector terminal of the digital transistor 303 maintains the off state. Further, the FET 304 and the digital transistor 305 of the controller power supply unit 201 also maintain the off state.

As described above, in a case where the AC plug 102 is plugged in while the power source switch 104 is being in the off state, the DC power 309 output by the power source unit 103 is applied to the power source switch 104.

Next, operation after the user performs on operation of the power source switch 104 will be described. At t3, the user changes the state of the power source switch 104 to an on state. In response to the change of the state of the power source switch 104 to the on state, the DC power 306 output from the power source unit 103 is input to the power source switch signal 307 via the power source switch 104. Then, a power source voltage input to the power source switch signal 307 is applied to the base terminal of the digital transistor, and the digital transistor 305 is switched to an on state (t4).

When the digital transistor 305 is switched to the on state, a potential difference is generated between the source terminal and the gate terminal of the FET 304, and the FET 304 is switched to an on state (t5). When the FET 304 becomes the on state, the DC power 309 output from the power source unit 103 is supplied to the voltage conversion unit 202 via the FET 304. The voltage conversion unit 202 outputs the DC power 308 having a voltage lower than that of the DC power 309 supplied from the power source unit 103. The DC power 308 is supplied to the CPU 204, the memory 205, the HDD 206, the image processing unit 207, and the like. Further, the DC power 308 is applied to the base terminal of the digital transistor 303 of the power-source-switch power supply unit 203. Because of application of the DC power 308, the digital transistor 303 is changed to an on state (t7).

In response to the change of the state of the digital transistor 303 to the on state, a base potential of the transistor 302 is reduced, and the transistor 302 becomes the off state (t8). When the transistor 302 becomes the off state, no potential difference is generated between the source terminal and the gate terminal of the FET 301, and the FET 301 becomes the off state (t9). When the FET 301 becomes the off state, supply of the DC power 309 output from the power source unit 103 to the power source switch 104 is stopped. With this, in a case where the power source switch 104 is in the on state, it is possible to supply DC power having a voltage lower than that of output from the voltage conversion unit 202 to the power source switch 104, instead of supplying high-voltage DC power output from the power source unit 103 to the power source switch 104. With this, in a case where the MFP 100 is in the on state, it is possible to restrain power consumption of the power source switch 104.

Figure 5:
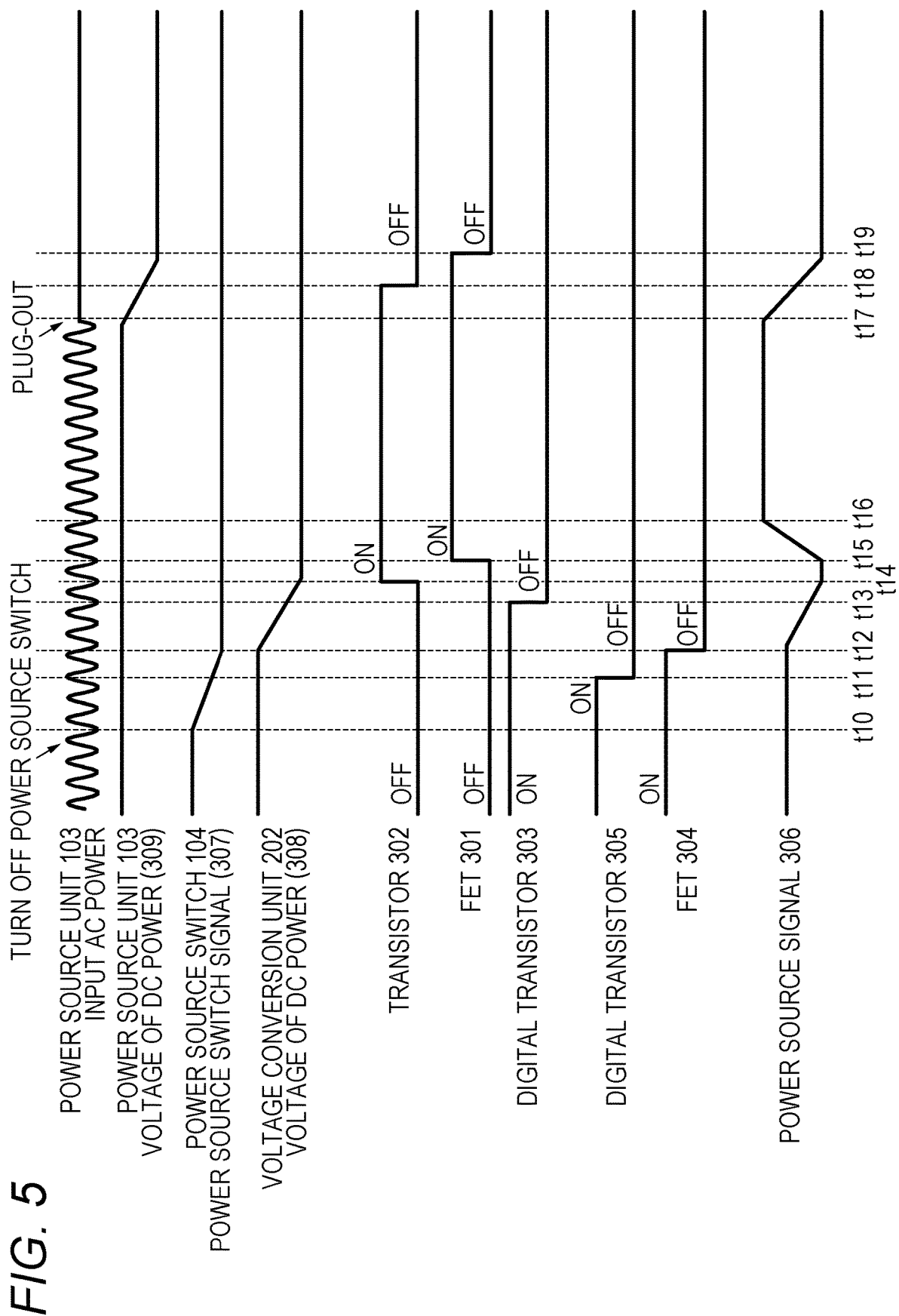
FIG. 5 is a timing chart showing operation of a power-source-switch power supply unit and a controller power supply unit at the time of turning off a power source of the information processing apparatus according to an embodiment of the present disclosure.

FIG. 5 is a timing chart showing operation of the power-source-switch power supply unit 203 and the controller power supply unit 201 at the time of plugging out the power source in this embodiment. In a case where the power source switch 104 is in the on state, the FET 301 and the transistor 302 of the power-source-switch power supply unit 203 are off and the digital transistor 303 thereof is on. Meanwhile, both the digital transistor 305 and the FET 304 of the controller power supply unit 201 are on. At t10, the user turns off the power source switch 104. Then, a voltage of the power source switch signal 307 is reduced, and the digital transistor 305 becomes the off state (t11). When the digital transistor 305 transitions to the off state, a potential difference between the source and the drain of the FET 304 is reduced, and the FET 304 becomes the off state (t12).

When the FET 304 becomes the off state, DC power is not supplied to the voltage conversion unit 202, and the DC power 308 is reduced. Then, the digital transistor 303 transitions to the off state (t13). In response to the transition of the state of the digital transistor 303 to the off state, the transistor 302 becomes the on state (t14). When the transistor 302 is turned on, a potential difference is generated between the source and the drain of the FET 301, and the FET 301 is turned on (t15). With this, the DC power 309 output by the power source unit 103 is supplied to the DC power 306 of the power source switch 104. With the above-mentioned operation, when the power source switch 104 is turned off, it is possible to switch DC power supplied to the power source switch 104 from a power source voltage output by the voltage conversion unit 202 to DC power output by the power source unit 103. With this, it is possible to supply DC power to the power source switch 104 even in a case where the power source switch 104 is in the off state.

Further, when the power source is plugged out at t17, output from the power source unit 103 is reduced, and the transistor 302 is turned off accordingly (t18). Thereafter, the FET 301 also becomes the off state (t19).

As described above, in this embodiment, a source of supply of power to the power source switch 104 is changed between when the power source switch is in the on state and when the power source switch 104 is in the off state, and when the power source is on, power is supplied to the power source switch at a lower voltage. With this, it is possible to restrain power consumption of the power source switch 104 when the power source switch is in the on state. For example, in a case where the DC power 309 is 12 V, the DC power 308 is 5 V, and the minimum load current of the power source switch 104 is 1 mA, 12 mW is consumed if DC power supplied to the power source switch 104 is not switched and the DC power 309 is continuously supplied. Meanwhile, when DC power supplied to the power source switch 104 is switched and the DC power 308 is supplied, 5 mW is consumed. As described above, it is possible to restrain power consumption of the power source switch 104.

According to the embodiment of the present disclosure described above, it is possible to reduce power consumed in the power source switch 104 and the load resistor 312 by switching DC power flowing to the power source switch 104 to the DC power 308 having a voltage lower than that of the DC power 309 supplied from the power source unit 103.

Additional Embodiment

Note that, in this embodiment, DC power to be supplied to the power source switch 104 is switched between DC power output by the power source unit and DC power output by the voltage conversion unit by using a voltage of DC power output by the voltage conversion unit. The CPU 204 may control the power-source-switch power supply unit 203 after supply of power to the CPU 204 is started. The CPU 204 may execute a start-up program of the MFP 100 and perform control so that power to be supplied to the power source switch 104 is switched from the DC power 309 output from the power source unit 103 to the DC power 308 output from the voltage conversion unit 202. Further, an interrupt signal may be input to the CPU 204 in response to transition of the state of the power source switch 104 to the on state, and the CPU 204 may switch a path of supply of power to the power source switch 104 on the basis of the interrupt signal.

The present disclosure is also achieved by executing the following process. Specifically, the following process is such that software (program) that achieves a function of the above-mentioned embodiment is supplied to a system or an apparatus via a network or various storage media, and a computer (or CPU, MPU, or the like) of the system or the apparatus reads a program code and executes a program. In this case, the computer program and a storage medium storing the computer program fall within the scope of the present disclosure.

In view of the above circumstances, the present disclosure can switch a voltage to be supplied to a power source switch in accordance with a state of a power source of an apparatus and can therefore restrain power consumption of the power source switch.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-241725, filed Dec. 25, 2018, which is hereby incorporated by reference herein in its entirety.

What is claimed is:

1. An information processing apparatus, comprising:
a first converter configured to generate DC power of a first voltage;
a power source switch of the information processing apparatus operated by a user;
a second converter configured to, after the power source switch is switched on, convert the DC power of the first voltage supplied from the first converter to DC power of a second voltage, wherein the second voltage is lower than the first voltage; and
a second control module configured to switch whether to supply the DC power of the first voltage output from the first converter to the second converter,
wherein the DC power of the first voltage is supplied to the power source switch in a situation that the power source switch is off and the DC power of the first voltage is not supplied to the second converter,
wherein the DC power of the second voltage is supplied to the power source switch in a situation that the power source switch is on and the DC power of the first voltage is supplied to the second converter, and
wherein the second control module switches whether to supply the DC power of the first voltage output from the first converter to the second converter on the basis of a voltage supplied via the power source switch.

2. The information processing apparatus according to claim 1 further comprising:
a first control module configured to change a source of power supply to the power source switch from the first converter to the second converter based on output from the second converter.

3. The information processing apparatus according to claim 2, wherein the first control module changes the source of power supply to the power source switch from the first converter to the second converter in a case that a voltage output from the second converter becomes higher than a threshold.

4. The information processing apparatus according to claim 2, wherein the first control module including a transistor.

5. The information processing apparatus according to claim 1, wherein the first converter converts AC power to the DC power of the first voltage.

6. The information processing apparatus according to claim 5, wherein the first converter generates the DC power of the first voltage regardless of a state of the power supply switch.

7. The information processing apparatus according to claim 1, wherein the power source switch is a rocker switch.

8. The information processing apparatus according to claim 1, wherein the DC power of the second voltage is supplied to a controller of the information processing apparatus from the second converter.

9. The information processing apparatus according to claim 8, wherein the controller executes a start-up program of the information processing apparatus.

10. The information processing apparatus according to claim 1, wherein the DC power of the first voltage is not supplied to the power source switch in a situation that the DC power of the second voltage is supplied to the power source switch.

11. The information processing apparatus according to claim 4, wherein the second control module including a transistor.

* * * * *